May 13, 1930. N. A. HALLWOOD 1,758,037
COMPUTING SCALE
Filed Nov. 20, 1926 2 Sheets-Sheet 1
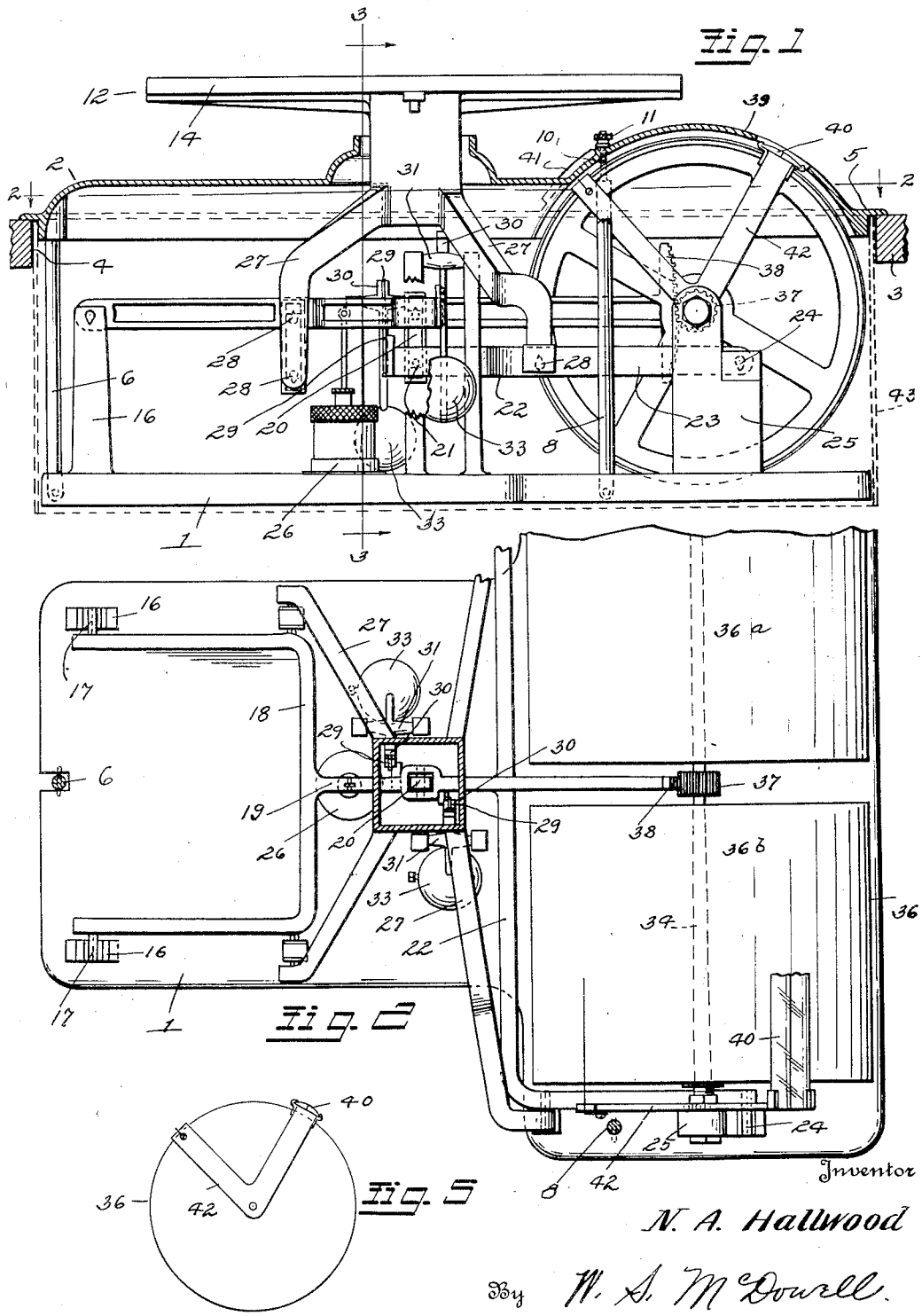
Inventor
N. A. Hallwood
By W. A. McDowell.
Attorney May 13, 1930. N. A. HALLWOOD 1,758,037
COMPUTING SCALE
Filed Nov. 20, 1926 2 Sheets-Sheet 2
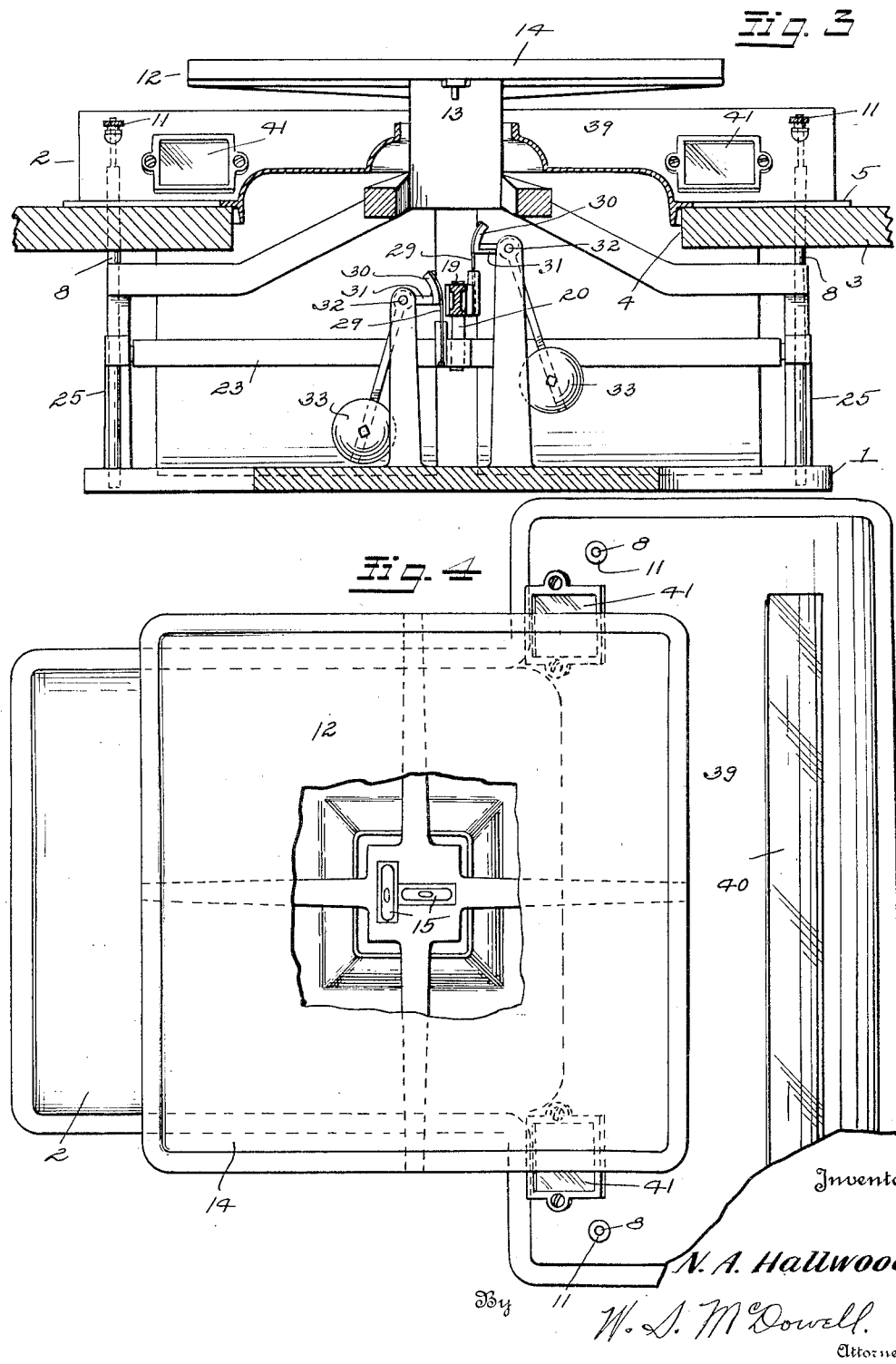

Patented May 13, 1930

1,758,037

UNITED STATES PATENT OFFICE

NATHAN A. HALLWOOD, OF COLUMBUS, OHIO

COMPUTING SCALE

Application filed November 20, 1926. Serial No. 149,763.

This invention relates to improvements in computing scales, and is directed especially to scales of the type wherein the movement of the beam structure from a neutral position under the action of applied weights is resistant by the operation of a pendulum means.

Another object of the invention resides in the provision of a scale of the character specified wherein the scale casing or housing is formed to be positioned within an opening provided in a shelf, counter or other base upon or with which the scale is mounted, to the end of enabling the weight receiver to be positioned more closely adjacent to the top of the counter so that the scale as a whole will require but a minimum of space on the counter and will be largely out of the way and concealed.

Other objects of the invention reside in a scale adapted to be inset in a counter or other support and wherein the scale mechanism is suspended from the scale housing which is secured directly to the support, provision being made for leveling the scale mechanism from the top of the housing; in the provision of level indicating means, such as spirit levels on the load receiver of the scale, whereby the true balance of the scale mechanism in operating planes may be determined from the top of the housing, and in various other features and improvements hereinafter particularly set forth.

For a further understanding of the invention reference is to be had to the following description and the accompanying drawings, wherein:

Figure 1 is a vertical longitudinal sectional view taken through a scale formed in accordance with the features of the present invention, Figure 2 is a plan view of the scale mechanism, partly in horizontal section, the plane of the figure being indicated by the line 2—2 of Figure 1, Figure 3 is a vertical transverse sectional view on the line 3—3 of Figure 1, Figure 4 is a plan view of the scale housing, a portion of the weight receiver being broken away to disclose the level indicating means, Figure 5 is a detail end elevation of the computing drum and the lens supporting means.

Referring more particularly to the drawings the numeral 1 designates the base upon which the scale mechanism is mounted. This base is adjustably suspended from the scale housing 2, which is mounted upon a shelf, counter or other support 3. The counter is provided with an opening 4 in which the scale proper is mounted, and in this instance the housing is formed to include an outwardly directed marginal flange 5, which rests upon the upper surface of the counter and retains the housing in its applied position. It will be observed that by means of this construction the greater portion of the body of the scale will lie below the plane of the top of the counter so that the scale will not interfere to any material extent with operations performed on the counter, avoiding the bulky appearance and condition presented by the ordinary counter carried scale. The base 1 is adjustably suspended from the housing by means of depending rods 6, the upper ends of the latter being rigidly connected with the housing, while their lower ends are pivotally connected as at 7 with the ends of the base 1. Also use is made of additional rods 8, which have their lower ends pivotally connected as at 9 with the base 1 and have their upper ends reduced and threaded as at 10. These ends pass through openings provided in the housing and are equipped with nuts or their equivalents 11, whereby through the use of this construction, the adjustment of the nuts will permit the plane of the base to be varied with respect to the plane of the housing in order that the scale mechanism per se may be adjusted to secure proper operating positions irrespective of variations in the level of the housing. This construction is particularly advantageous when pendulum types of weighing scales are carried by the base and where the latter should be placed in a true horizontal plane. Moreover, the construction permits of the adjustment of the base from the top of the housing whereby the operation of leveling may be carried out with convenience and facility.

The scale mechanism includes a weight receiver 12, formed to include a stem 13, which supports at its upper end a removable platter 14 above the plane of the housing. Below the platter 14 the stem includes a pair of spirit levels 15, disposed at right angles to each other, and it will be seen that by removing the platter the spirit levels may be viewed so that the operator by adjusting the nuts 11 will be provided with means for indicating when the base is properly positioned in its true horizontal plane.

Mounted upon the base are spaced bearing brackets 16 upon which is pivotally mounted, through the medium of knife edge bearings 17, one end of a yoke shaped beam 18, which terminates in a forwardly and longitudinally projecting centrally situated arm 19. To the end of this arm there is pivotally connected by knife edge bearings a bail 20, which has its lower portion similarly connected as at 21 with the outer end of a lower beam member 22, the latter being also terminated to include a yoke shaped extremity 23, which is pivotally mounted by knife edge bearings 24 upon a bracket 25, carried by the base 1, at the opposite ends of the latter as regards the bracket 16. By this construction the usual form of a compound beam is secured. One of the beam members is connected with a dash pot 26 for controlling the pivotal movements of the beam members and to stabilize the actuation thereof under applied loads.

The stem 13 of the weight receiver terminates at its lower end in a plurality of downwardly radiating diverging arms 27, which are pivotally connected by knife edge bearings 28 with the beam members 18 and 22 in order that the weight receiver will be pivotally supported by the beam mechanism. Each of the beam members, as shown in Fig. 3, is connected with a flexible strap 29, and each of said straps is also connected with an arcuate stirrup 30 provided upon the ends of bell crank levers 31, which are pivotally mounted as at 32 in connection with the base. The longer downwardly extending arms of the levers 31 carry adjustable weights 33, which may be set so that the action of these levers or pendulums will serve to counteract the weight of the stem 13 or the weight receiver bodily and to maintain the scale mechanism balanced in accordance with scales employing the pendulum principle of operation. It will be understood that when weights are applied to the platter 14, the beam members will be oscillated about their pivots and the movement thereof resisted increasingly by the action of the weights 33.

Rotatably mounted upon a shaft 34 carried in connection with the bearing brackets 25 is a computing drum 36, which includes sections 36ª and 36ᵇ. The shaft 34 is provided with a pinion 37 located between the drum sections and which is engaged by a segmental rack bar 38 carried on the forwardly projecting arm 19 of the beam member 18. It will be seen therefore that as the beam mechanism is deflected from its neutral position, the drum 36 will be revolved proportionately to indicate various weight values and if desired to provide price indications for the indicated weight values.

The housing 2 at one end is provided with a slight enlargement to receive the upper portion of the drum 36, which enlargement is in circular form and is indicated by the numeral 39. As shown in Figure 2 the enlargement 39 is formed on opposite sides of the vertical axis of the drum to include an elongated reading lens 40 and on its opposite side to include a pair of spaced and smaller lenses 41, the lenses 40 and 41 permitting both the customer and merchants to read the weighing positions and indications of the drum. It will be observed, by reference to Figure 5, that the lenses 40 and 41 are carried in connection with brackets 42 mounted upon the main bracket 25, so that the lenses will maintain their fixed relative positions with the drum throughout all positions of adjustment of the base 1. This could not be accomplished with the same degree of accuracy if the lenses were carried by the housing.

In view of the foregoing it will be seen by means of the present invention that I have provided a scale mechanism formed to be suspended from the scale housing and wherein provision is made for leveling the scale means by adjusting the same relative to the housing. Additional convenience is secured in the adjustment of the scale means by the provision of the spirit levels carried in connection with the weight receiver, whereby the operator may readily determine the level of the scale means from the exterior of the housing. It will be understood that it is not mandatory to mount the housing directly on a shelf or counter, but that the casing may be extended, as indicated at 43 in Figure 1 to support the scale beams above the plane of a shelf or counter if desired. Another feature of importance resides in mounting the reading lenses so that the latter will be formed unitarily with the scale means, whereby a fixed relationship is maintained at all times between the computing drum and said lenses.

What is claimed is:

1. In a scale, a housing, a base suspended from said housing, pivotal connections between said base and said housing, adjustable threaded connections between said base and said housing admitting of variations in the working positions of said base with respect to said housing, and a scale mechanism including pendulum weights carried bodily by said base and adjustable in unison therewith.

2. In a scale, a housing, a frame depending from said housing, a platform pivotally connected with the lower portion of said frame, adjustable connections between said platform and said housing permitting of variations in the operating planes of said platform, a pendulum actuated beam structure carried by said platform, a weight receiver connected with the beam structure, and a weight indicating drum carried by said platform and actuated by said beam structure.

3. In a scale, a housing, a platform adjustably suspended from said housing, a beam structure carried bodily by said platform, a weight receiver mounted on said beam structure, and level indicating means carried by said weight receiver.

4. In a scale, a housing, a platform pivotally suspended from said housing, a beam structure mounted bodily on said platform, a weight receiver pivotally carried by said beam structure and projecting upwardly above said housing, and a pair of spirit levels mounted in connection with the upper portion of said weight receiver.

5. In a scale, a housing, a platform adjustably suspended from said housing, a beam structure pivotally carried by said platform, a weight indicating means actuated by said beam structure, and a reading lens positioned adjacent to an opening provided in said housing and said indicating means, said lens being carried by said platform and adjustable bodily therewith.

6. In a scale, a rotatably mounted computing drum, a housing arranged contiguous to said drum and provided with a reading opening, and a lens arranged to occupy said opening and adjustable about the axis of said drum.

7. In a scale, a base, bearing brackets arising from said base, a longitudinally extending shaft journaled in connection with said brackets, a computing drum rotatable about the longitudinal axis of said shaft, a housing arranged adjacent to said drum and provided with a pair of reading openings, a frame adjustable about the axis of said shaft, and reading norms carried by said frame and positioned contiguous to said drum and the openings in said housing.

8. In a scale, the combination of a counter support having an opening formed therein, a scale housing formed with a flange arranged to rest upon the marginal edges of said opening, a frame depending from said housing, a platform pivoted to the lower portion of said frame, a pendulum actuated weighing mechanism carried by said platform, threaded connections between said platform and said housing permitting of adjustment of said platform in a substantially vertical plane, said threaded connections being accessible above said housing, and level indicating means carried by said weighing mechanism.

In testimony whereof I affix my signature.

NATHAN A. HALLWOOD.